(12) United States Patent
Amine et al.

(10) Patent No.: US 9,431,649 B2
(45) Date of Patent: Aug. 30, 2016

(54) COATED ELECTROACTIVE MATERIALS

(75) Inventors: Khalil Amine, Oakbrook, IL (US); Ali Abouimrane, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 640 days.

(21) Appl. No.: 12/951,284

(22) Filed: Nov. 22, 2010

(65) Prior Publication Data

US 2011/0121240 A1    May 26, 2011

Related U.S. Application Data

(60) Provisional application No. 61/263,470, filed on Nov. 23, 2009.

(51) Int. Cl.

| | | |
|---|---|---|
| H01M 4/04 | (2006.01) | |
| H01M 4/131 | (2010.01) | |
| H01M 4/136 | (2010.01) | |
| H01M 4/1391 | (2010.01) | |
| H01M 4/1397 | (2010.01) | |
| H01M 4/36 | (2006.01) | |
| H01M 4/505 | (2010.01) | |
| H01M 4/525 | (2010.01) | |
| H01M 4/58 | (2010.01) | |
| H01M 4/62 | (2006.01) | |
| H01M 6/16 | (2006.01) | |
| H01M 10/052 | (2010.01) | |
| H01M 10/39 | (2006.01) | |
| H01M 12/06 | (2006.01) | |
| H01M 12/08 | (2006.01) | |

(52) U.S. Cl.
CPC ......... *H01M 4/0402* (2013.01); *H01M 4/0416* (2013.01); *H01M 4/0471* (2013.01); *H01M 4/131* (2013.01); *H01M 4/136* (2013.01); *H01M 4/1391* (2013.01); *H01M 4/1397* (2013.01); *H01M 4/366* (2013.01); *H01M 4/505* (2013.01); *H01M 4/525* (2013.01); *H01M 4/5825* (2013.01); *H01M 4/625* (2013.01); *H01M 6/16* (2013.01); *H01M 10/052* (2013.01); *H01M 10/3909* (2013.01); *H01M 12/06* (2013.01); *H01M 12/08* (2013.01); *Y02E 60/122* (2013.01)

(58) Field of Classification Search
USPC ............... 429/220, 231.95, 231.3, 212, 209; 252/514, 182.1; 977/773, 896, 734
See application file for complete search history.

(56) References Cited

U.S. PATENT DOCUMENTS

| | | | |
|---|---|---|---|
| 5,789,114 A | 8/1998 | Adachi et al. | |
| 2002/0180300 A1* | 12/2002 | Inukai et al. | 310/233 |
| 2007/0148545 A1* | 6/2007 | Amine | B82Y 30/00 429/231.1 |
| 2007/0215841 A1* | 9/2007 | Ford et al. | 252/503 |
| 2009/0186275 A1* | 7/2009 | Exnar et al. | 429/220 |
| 2010/0143798 A1* | 6/2010 | Zhamu et al. | 429/212 |
| 2011/0186789 A1* | 8/2011 | Samulski et al. | 252/514 |
| 2012/0132849 A1* | 5/2012 | Fan | 252/182.1 |

OTHER PUBLICATIONS

Nakashima, N. et al., "Fundamentals and applications of soluble carbon nanotubes", Chemistry Letter, vol. 36, No. 6, 2007, pp. 692-697.
Si, Y. et al., "Synthesis of Water Soluble Graphene", Nano Letters, vol. 8, No. 6, 2008, pp. 1679-1682.
Wang, G. et al., "Synthesis of enhanced hydrophilic and hydrophobic graphene oxide nanosheets by a solvothermal method", Carbon, vol. 47, 2009, pp. 68-72.

* cited by examiner

*Primary Examiner* — Monique Peets
(74) *Attorney, Agent, or Firm* — Foley & Lardner LLP

(57) ABSTRACT

A process includes suspending an electroactive material in a solvent, suspending or dissolving a carbon precursor in the solvent; and depositing the carbon precursor on the electroactive material to form a carbon-coated electroactive material. Compositions include a graphene-coated electroactive material prepared from a solution phase mixture or suspension of an electroactive material and graphene, graphene oxide, or a mixture thereof.

16 Claims, 2 Drawing Sheets

COATED ELECTROACTIVE MATERIALS

CROSS-REFERENCE TO RELATED APPLICATIONS

This application claims the benefit of U.S. Provisional Patent Application 61/263,470, filed on Nov. 23, 2009, the entire contents of which are incorporated herein by reference, for any and all purposes.

STATEMENT OF GOVERNMENT INTEREST

The United States Government claims certain rights pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNOLOGY

The technology is generally related to electrochemical cell materials.

BACKGROUND

The background section is intended to provide a background or context to the various embodiments described herein, and within the claims. The background may include concepts that could be pursued, but are not necessarily ones that have been previously conceived or pursued. Therefore, unless otherwise indicated herein, what is described in this section is not prior art to the description and claims in this application, and is not admitted to be prior art by inclusion in this section.

Primary and rechargeable lithium secondary batteries have been the object of considerable research and development. The aim was to develop a low cost battery, with high energy density and good electrochemical performance. With this in mind, a large number of battery designs have been developed to comply with different applications such as portable products, electric vehicles (EV) and start-light-ignition (SLI) vehicles. The focus to date has been on Li-ion batteries that use a lithium metal oxide, such as $LiCoO_2$, $Li(Ni_{1/3}Co_{1/3}Mn_{1/3})O_2$, $Li(Ni_{0.8}Co_{0.15}Al_{0.05})O_2$, and $LiNi_{0.5}Mn_{1.5}O_4$, or phosphate, such as $LiFePO_4$ and $LiMnPO_4$, as cathode materials, and metal oxides, such as $Li_4Ti_5O_{12}$, $TiO_2$, $SiO_x$, and $SnO_2$, as anode materials.

In some cases, electroactive materials used as the cathode or anode in lithium batteries have poor electronic conductivity, and as a consequence, their electrochemical performance and rate capability suffers. Examples of such materials include $Li_4Ti_5O_{12}$, $SiO_x$, $A_2MTi_4O_{16}$ (A: Li, Na, K) (M: Ba, Ca, Sr, Mg, Zn), high energy composite electrodes $Li_2MnO_3$—$LiMO_2$ (M: Mn, Co, Ni), $LiFePO_4$, $LiMnPO_4$, $LiCoPO_4$, and $LiNiPO_4$. These materials exhibit poor rate capability and poor utilization at high electrode loading densities and therefore are typically ill-suited for applications that require high energy and high power such as plug-in hybrid electric vehicles (PHEV) and EVs.

To overcome this limitation, lithium metal oxides with layered or spinel structures, such as $Li_{1.2}Mn_{0.5}Ni_{0.176}Co_{0.1}O_2$, and metal oxides, such as $TiO_2$ and $SnO_2$, have been proposed as cathode and anode materials, respectively. However, despite their large capacity, such oxides exhibit lower electrical conductivity that has restricted their use to low-power applications.

Due to the conductivity limitations of some electroactive materials, a cathode of choice is $LiCoO_2$, and an anode of choice is either carbon or $Li_4Ti_5O_{12}$. However, $LiCoO_2$ operates at only 4.2V (versus Li), with a capacity of 150 mAh/g, and the high price and toxicity of cobalt is prohibitive for large size batteries. With respect to the anode, $Li_4Ti_5O_{12}$ has a capacity of 160 mAh/g, which is insufficient to meet PHEV and EV capacity requirements.

Carbon is known as an electrical conductor and is used to increase the electronic conductivity of materials like $LiFePO_4$. In general, carbon coating of oxide materials is carried out using a pyrolysis process that forms a thin layer of pyrolitic graphite on the surface of particles and allows for an even distribution of electrons on the surface of each particle. Carbon coating of electroactive materials to counter low electrical conductivity, for example in the case of $LiFePO_4$, has resulted in significant improvement in the rate capability. With 5 wt % carbon coating, the electrical conductivity of $LiFePO_4$ increases from $10^{-7}$ to $10^{-3}$ mS. In this case, the addition of carbon is relatively straightforward due to the stability of $Fe^{2-}$ in a reducing atmosphere (e.g., $H_2$, CO, $CO_2$ or even Ar, $N_2$ or He with carbon). However, the use of carbon, or a reducing agent, for coating other oxide materials has been very limited due to the poor stability of metal ions under reducing conditions. In most cases, an attempt to coat a layered metal oxide with carbon results in partial, or total, reduction of the oxide.

SUMMARY

According to one aspect, a low temperature process is provided for coating the surface of particles of electroactive electrode materials for electrochemical devices (such secondary batteries, primary batteries and all kind of capacitors) with an electronic conductive coating of graphene, graphene oxide, or carbon nanotubes. In some embodiments, the process includes suspending an electroactive material in a solvent, suspending or dissolving a carbon precursor in the solvent, and depositing the carbon precursor on the electroactive material to form a carbon-coated electroactive material. In some embodiments, the solvent is an organic solvent or water. According to some embodiments, a composition comprises such a carbon-coated electroactive material as formed.

In some embodiments, the carbon precursor is suspended in the solvent after the electroactive material is suspended in the solvent. In other embodiments, the electroactive material is suspended in the solvent after the carbon precursor is suspended in the solvent. In yet other embodiments, the depositing comprises heating the suspended or dissolved carbon precursor, the solvent, and the electroactive material. In some embodiments, the depositing comprises removing the solvent. In some embodiments, the removing the solvent comprises applying heat. In some embodiments, the removing the solvent comprises applying a vacuum. In some embodiments, the removing the solvent comprises applying heat and a vacuum.

In some embodiments, the carbon precursor is graphene oxide and the depositing includes adding a reducing agent. In some such embodiments, the reducing agent is hydrazine.

In some embodiments, the process also includes heating the electroactive material with the deposited carbon precursor. In such embodiments, such heating may be performed in an inert atmosphere. In such embodiments, such heating may be performed in a reducing atmosphere. In such embodiments, such heating may be performed in an oxidizing atmosphere. In some embodiment such heating may be performed in an atmosphere comprising an inert gas, reducing gas, or an oxidizing gas. In other embodiments, the heating is performed at a temperature in the range from about 50° C. to 1000° C., from about 50° C. to about 500° C., or from about 250° C. to about 450° C.

In some embodiments, the carbon precursor is graphene, graphene oxide, carbon nano-tubes, derivatives thereof, or a combination of any two or more such carbon precursors. In other embodiments, the graphene, graphene oxide, or carbon nano-tubes are functionalized with, i.e. derivatives containing groups having one or more of O, N, P, S, F, Cl, Bi, Si, Al, Co, Ni, Fe, Zr, Mn, Cr, Sr, or V. In other embodiments, the graphene, graphene oxide, or carbon nano-tubes are oxygenated, hydrated, hydrogenated, halogenated, sulfonated, or a combination of any two or more. In yet other embodiments, the graphene, graphene oxide, or carbon nano-tubes are functionalized with a moiety that includes an amine, an isocyanate, a phosphonate, a sulfonate, a phosphine, a thiocyanates, or a mixture of any two or more such groups. In still other embodiments, the graphene, graphene oxide, or carbon nano-tubes are functionalized by reaction with a compound selected from the group consisting of allylamine, phenylisocyanate, methylisocyanate, p-phenyl-$SO_3H$.

In some embodiments, the carbon coating is present from about 0.001 wt % to about 55 wt %, based on the weight of the electroactive material.

In some embodiments, the electroactive material is a positive electroactive material. In other embodiments, the electroactive material is a spinel, a olivine, $LiFePO_4$, $LiMnPO_4$, $LiCoPO_4$, $LiNiPO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $LiMet_{0.5}Mn_{1.5}O_4$, $LiMet_{0.5}Mn_{1.5}O_4$, $Li_{1+x}Ni_\alpha Mn_\beta Co_\gamma Met'_\delta O_{2-z}F_{z'}$, $A_nB_2(XO_4)_3$, vanadium oxide, or a mixture of any two or more such materials, where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; $0 \le x \le 0.3$; $0 \le y \le 0.5$; $0 \le z \le 0.5$; $0 \le x' \le 0.4$; $0 \le \alpha \le 1$; $0 \le \beta \le 1$; $0 \le \gamma \le 1$; $0 \le \delta \le 0.4$; $0 \le z' \le 0.4$; and $0 \le n' \le 3$. In yet other embodiments, the electroactive material is coated with a material selected from the group consisting of $Al_2O_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $AlF_3$, $CaF_2$, Mo, Ta, W, Fe, Co, Cu, Ru, Pa, Pt, Al, Si, Se, and a mixture of any two or more materials.

In some embodiments, the electroactive material is a negative electroactive material. In other embodiments, the electroactive material is amorphous carbon, $Li_4Ti_5O_{12}$, $TiO_2$, tin, tin alloys, silicon, silicon alloys, metal nitrides, metal phosphides, intermetallic compounds, metal oxide, lithium metal oxide, and a mixture of any two or more such materials. In yet other embodiments the electroactive material is coated with a material selected from the group consisting of $Al_2O_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $CaF_2$, Mo, Ta, W, Fe, Co, Cu, Ru, Pa, Pt, Al, Si, Se, and a mixture of two or more of thereof.

In another aspect, a composition is provided including a graphene-coated electroactive material prepared from a solution phase mixture or suspension of an electroactive material and graphene, graphene oxide, or a mixture of such materials.

DETAILED DESCRIPTION

Figure 1:
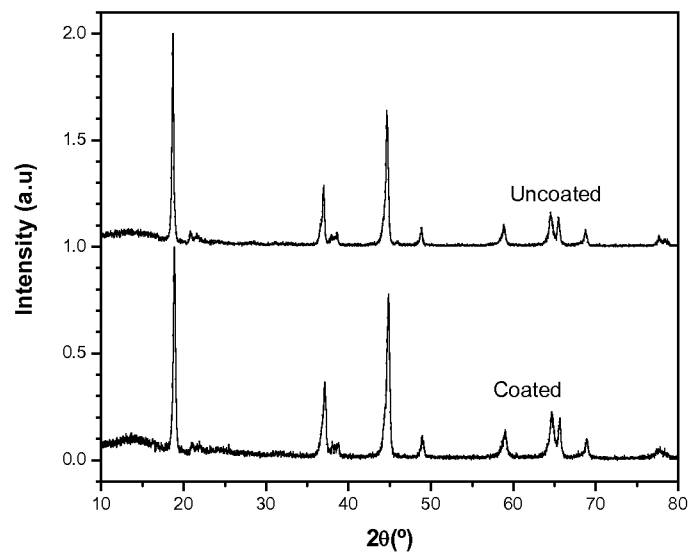
FIG. 1 is a XRD (x-ray diffraction) graph of coated (10%) and uncoated $Li_{1.2}Mn_{0.5}Ni_{0.176}Co_{0.1}O_2$, according to one example.

The illustrative embodiments described in the detailed description are not meant to be limiting. Other embodiments may be utilized, and other changes may be made, without departing from the spirit or scope of the subject matter presented here.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "graphene" refers to a planar sheet of $sp^2$-bonded carbon atoms that are densely packed in a honeycomb crystal lattice. As used herein, "graphene oxide" is an oxide of graphene and may contain carbon, oxygen, and hydrogen in variable ratios. It is typically obtained by treating graphite with strong oxidizers. It may alternatively be known in the art as graphite oxide, graphitic oxide or graphitic acid.

In one aspect, a method is provided for preparing carbon-coated electroactive materials that avoid the high temperature, pressure, and manufacturing extremes associated with conventional chemical vapor deposition (CVD), and other pyrolysis methods of preparing such materials. In many instances where carbon coated metal oxides, which form electroactive materials, are prepared, the metal oxide tends to reduce to the metal species when coated with the carbon. The present methods avoid this, and can produce carbon-coated metal oxides without the problems associated with the reductions.

According to some embodiments, the process includes suspending an electroactive material in a solvent, suspending or dissolving a carbon precursor, or conductive agent, in the solvent, and depositing the carbon precursor on the electroactive material to form a carbon-coated electroactive material. In some such embodiments, the electroactive material is suspended in the solvent prior to dissolution or suspension of the carbon precursor in the solvent. In other words, the carbon precursor is added to the electroactive material. In other such embodiments, the carbon precursor is dissolved or suspended in the solvent prior to the suspension of the electroactive material in the solvent. In other words, the electroactive material is added to the carbon precursor.

After mixing, the carbon precursor deposits on the electroactive material to form a carbon-coated electroactive material. Such deposition occurs during solvent removal, such that the electroactive material is coated with the conductive agent that was suspended or dissolved in the solvent. In some embodiments, a carbon precursor may be reduced with a reducing agent to deposit a reduced carbon precursor on the electroactive material. In some embodiments, such a reducing agent is hydrazine. In some embodiments, the solvent removal is accomplished at low temperature. In some embodiments, the solvent removal may be conducted in vacuo.

According to some embodiments, the deposition is facilitated by heating of the suspension, or solution, to drive off the solvent, whether an organic solvent or water. Such heating may be performed at temperatures from about 25° C. to about 200° C., from about 40° C. to about 180° C., or from about 50° C. to about 150° C. To avoid overheating of the mixture to drive off the solvent, in some embodiments, the solvent may be removed in vacuo, with or without heating. After the solvent has been removed, the mixture is then further heated to a higher temperature, according to some embodiments. In such other embodiments, the higher temperature is from about 50° C. to 1000° C., from about 50° C. to about 500° C., or from about 250° C. to about 450° C. Alternatively, the heating may be performed at the higher temperature range in the first instance.

In some embodiments, the process is carried out in a reducing atmosphere, an oxidizing atmosphere, or inert atmosphere. In other embodiments, the heating is carried out in a reducing atmosphere. For example, the heating may be conducted under vacuum, in the presence of $H_2$, CO, propene, or other reducing gas, or in a mixture of a reducing gas with an inert gas. In other embodiments, the heating is carried out in an oxidizing atmosphere. For example, the heating may be conducted in the presence of $O_2$, or in air. In yet other embodiments, the heating is carried out in an inert atmosphere. For example, the heating may be conducted in the presence of He, Ne, Ar, Kr, or $N_2$.

Suitable carbon precursors include graphene, graphene oxide, carbon nano-tubes, or a combination of any two or more such precursors. Graphene may be dissolved or dispersed in an appropriate solvent, or solvent mixture, if it is prepared from the reduction of graphene oxide dispersed in such solvent(s).

The precursors, and even the base materials themselves (i.e. graphene or graphene oxide), are hydrophilic and are not readily dispersed in organic solvents, however, they may be derivatized to include solubilizing moieties. For example, the solubility of graphene oxide in water is about 0.7 mg/ml, however, the addition of an appropriate functional group can increase the solubility. Suitable functional groups include, but are not limited to, amines, isocyanates, phosphonates, sulfonates, phosphines, and thiocyanates. For example, the reaction of allylamine with graphene oxide provides a graphene oxide-allylamine complex that has a solubility of 1.55 mg/ml in water. Reaction of graphene oxide with phenylisocyanate ($C_6H_5NCO$) provides a complex that has a solubility of 0.56 mg/ml in N,N-dimethylformamide (DMF). Phenylisocyanate reacts with the hydroxyl group present in the graphene oxide (GO) according to:

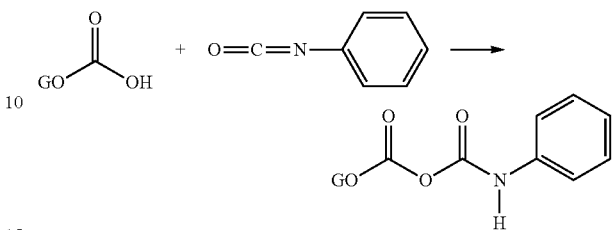

As another example, graphene is insoluble in water, however when the graphene is functionalized with p-phenyl-$SO_3H$, the compound is readily dispersed, and/or dissolved in water. Additional functional groups include those with elements such as O, N, P, S, F, Cl, Bi, Si, Al, Co, Ni, Fe, Zr, Mn, Cr, Sr, or V.

Graphene- and graphene oxide-based materials, may be readily dispersed and possibly dissolved in solvents such as N-methylpyrrolidone (NMP) and water, which are typically used during laminated electrode preparation. In this case, the graphene is dispersed or dissolved in the solvent and then added to the binder and the active material to make a slurry. The slurry is then cast and the solvent removed from the electrode by vacuum drying, thereby resulting in a highly dispersed, conductive, graphene or graphene oxide in the electrode. This process leads to a highly conductive electrode that resulted improved performance of the cell. In addition, this process can lead to significantly reducing the amount of conductive additive in the electrode which can result in high active material loading and additional cell capacity.

After formation, the carbon-coating is present in the carbon-coating electroactive material from about 0.001 wt % to about 55 wt %, based on the weight of the electroactive material. In some embodiments, the carbon-coating is present from about 0.01 wt % to about 55 wt %, from about 0.1 wt % to about 55 wt %, from about 1 wt % to about 30 wt %, from about 1 wt % to about 25 wt %, from about 1 wt % to about 20 wt %, from about 1 wt % to about 15 wt %, from about 1 wt % to about 10 wt %, from about 2 wt % to about 10 wt %, or from about 2 wt % to about 5 wt %.

In some embodiments, suitable solvents for use in the processes, include both organic solvents and water. Suitable organic solvents include those organic solvents that may be removed under the described conditions of the processes. For example, the organic solvents may include, but are not limited to alcohols, ethers, esters, ketones, aromatics, and heterocyclics. In some embodiments, the solvent is methanol, ethanol, n-propanol, iso-propanol, n-butanol, 1-methylpropanol, 2-methylpropanol, tert-butanol, N-methylpyrrolidone, pyridine, imidazole, ethylether, methylethylether, ethylacetate, propylacetate, acetone, methyl iso-butylketone, benzene, pyridine, and toluene.

The electroactive materials suitable for use in the methods include most known electroactive materials. In some embodiments, the electroactive material is a material that is unstable in a reducing atmosphere or under reducing conditions.

In some embodiments, the electroactive material is a positive electroactive material. In some such embodiments, the electroactive material is a spinel, a olivine, $LiFePO_4$, LiMnPO$_4$, LiCoPO$_4$, LiNiPO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$ (an NMC, i.e. nickel-manganese-cobalt) LiMn$_2$O$_4$, LiFeO$_2$, LiMet$_{0.5}$Mn$_{1.5}$O$_4$, LiMet$_{0.5}$Mn$_{1.5}$O$_4$, Li$_{1+x'}$Ni$_\alpha$Mn$_\beta$Co$_\gamma$Met'$_\delta$O$_{2-z}$F$_{z'}$, A$_n$,B$_2$(XO$_4$)$_3$, vanadium oxide, or a mixture of any two or more such materials. According to these materials, Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; $0 \leq x \leq 0.3$; $0 \leq y \leq 0.5$; $0 \leq z \leq 0.5$; $0 \leq x' \leq 0.4$; $0 \leq \alpha \leq 1$; $0 \leq \beta \leq 1$; $0 \leq \gamma \leq 1$; $0 \leq \delta \leq 0.4$; $0 \leq z' \leq 0.4$; and $0 \leq n' \leq 3$.

In some embodiments, the electroactive material is a coated with a second electroactive material. In some embodiments, the second electroactive material is coated onto the graphene-coated electroactive material. In other embodiments, the electroactive material is coated with a second electroactive material prior to coating with graphene. For example, the second electroactive material may be, but is not limited to, a material such as Al$_2$O$_3$, ZrO$_2$, SiO$_2$, MgO, TiO$_2$, CaO, SnO$_2$, WO$_3$, In$_2$O$_3$, Ga$_2$O$_3$, Sc$_2$O$_3$, Y$_2$O$_3$, La$_2$O$_3$, HfO$_2$, V$_2$O$_5$, Nb$_2$O$_5$, Ta$_2$O$_5$, MnO, MnO$_2$, CoO, Co$_2$O$_3$, NiO, NiO$_2$, CuO, ZnO, MgF$_2$, AlF$_3$, CaF$_2$, Mo, Ta, W, Fe, Co, Cu, Ru, Pa, Pt, Al, Si, Se, or a mixture of any two or more such materials.

In some embodiments, the electroactive material is a positive electroactive material with composite formula of $\beta$LiMe'O$_2$-(1-$\beta$)Li$_2$Me''O$_3$; wherein $0<41<1$; Me' is one or more metal ions having an average oxidation state of three with at least one ion being Ni; and Me'' is one or more metal ions having an average oxidation state of four with at least one ion being Mn. In some embodiments, the LiMe'O$_2$ and Li$_2$Me''O$_3$ are layered and the ratio of Li to Me' and Me'' is greater than one but less than two.

In some embodiments, the electroactive material is a negative electroactive material. In some such embodiments, the electroactive material is amorphous carbon, Li$_4$Ti$_5$O$_{12}$, TiO$_2$, M$^3$Li$_2$Ti$_6$O$_{14}$ where M$^3$ is Sr, Ba, Ca or Mg, M$^4_2$Li$_2$Ti$_6$O$_{14}$ where M$^4$ is Na or K, tin, tin alloys, silicon, silicon alloys, metal nitrides, metal phosphides, intermetallic compounds, metal oxides, lithium metal oxides, are a mixture of any two or more such materials. In some embodiments, the electroactive material is a coated with a second electroactive material. For example, the second electroactive material may be, but is not limited to, a material such as Al$_2$O$_3$, ZrO$_2$, SiO$_2$, MgO, TiO$_2$, CaO, SnO$_2$, WO$_3$, In$_2$O$_3$, Ga$_2$O$_3$, Sc$_2$O$_3$, Y$_2$O$_3$, La$_2$O$_3$, HfO$_2$, V$_2$O$_5$, Nb$_2$O$_5$, Ta$_2$O$_5$, MnO, MnO$_2$, COO, Co$_2$O$_3$, NiO, NiO$_2$, CuO, ZnO, MgF$_2$, AlF$_3$, CaF$_2$, Mo, Ta, W, Fe, Co, Cu, Ru, Pa, Pt, Al, Si, Se, or a mixture of any two or more such materials.

In another aspect, a composition is provided including the carbon-coated electroactive material prepared by the methods described above. Thus, in some embodiments a composition is provided that includes a carbon-coated electroactive material, prepared by suspending an electroactive material in a solvent, suspending or dissolving a carbon precursor, or conductive agent, in the solvent, and depositing the carbon precursor on the electroactive material to form a carbon-coated electroactive material. In some embodiments, the carbon coating on the electroactive material is graphene, graphene oxide, carbon nano-tubes, or a combination of any two or more such carbon materials.

According to some embodiments, the carbon-coating is present in the carbon-coating electroactive material from about 0.001 wt % to about 55 wt %, based on the weight of the electroactive material. In some embodiments, the carbon-coating is present from about 0.01 wt % to about 55 wt %, from about 0.1 wt % to about 55 wt %, from about 1 wt % to about 30 wt %, from about 1 wt % to about 25 wt %, from about 1 wt % to about 20 wt %, from about 1 wt % to about 15 wt %, from about 1 wt % to about 10 wt %, from about 2 wt % to about 10 wt %, or from about 2 wt % to about 5 wt %.

In some embodiments, the electroactive material is a positive electroactive material. In some such embodiments, the electroactive material is a spinel, a olivine, LiFePO$_4$, LiMnPO$_4$, LiCoPO$_4$, LiNiPO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$ (an NMC, i.e. nickel-manganese-cobalt) LiMn$_2$O$_4$, LiFeO$_2$, LiMet$_{0.5}$Mn$_{1.5}$O$_4$, LiMet$_{0.5}$Mn$_{1.5}$O$_4$, Li$_{1+x'}$Ni$_\alpha$Mn$_\beta$Co$_\gamma$Met'$_\delta$O$_{2-z}$F$_{z'}$, A$_n$B$_2$(XO$_4$)$_3$, vanadium oxide, or a mixture of any two or more such materials. According to these materials, Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; $0 \leq x \leq 0.3$; $0 \leq y \leq 0.5$; $0 \leq z \leq 0.5$; $0 \leq x' \leq 0.4$; $0 \leq \alpha \leq 1$; $0 \leq \beta \leq 1$; $0 \leq \gamma \leq 1$; $0 \leq \delta \leq 0.4$; $0 \leq z' \leq 0.4$; and $0 \leq n' \leq 3$.

In some embodiments, the electroactive material is a coated with a second electroactive material. In some embodiments, the second electroactive material is coated onto the graphene-coated electroactive material. In other embodiments, the electroactive material is coated with a second electroactive material prior to coating with graphene. For example, the second electroactive material may be, but is not limited to, a material such as Al$_2$O$_3$, ZrO$_2$, SiO$_2$, MgO, TiO$_2$, CaO, SnO$_2$, WO$_3$, In$_2$O$_3$, Ga$_2$O$_3$, Sc$_2$O$_3$, Y$_2$O$_3$, La$_2$O$_3$, V$_2$O$_5$, Nb$_2$O$_5$, Ta$_2$O$_5$, MnO, MnO$_2$, CoO, Co$_2$O$_3$, NiO, NiO$_2$, CuO, ZnO, MgF$_2$, AlF$_3$, CaF$_2$, Mo, Ta, W, Fe, Co, Cu, Ru, Pa, Pt, Al, Si, Se, or a mixture of any two or more such materials.

In some embodiments, the electroactive material is a negative electroactive material. In some such embodiments, the electroactive material is amorphous carbon, Li$_4$Ti$_5$O$_{12}$, TiO$_2$, tin, tin alloys, silicon, silicon alloys, metal nitrides, metal phosphides, intermetallic compounds, metal oxides, lithium metal oxides, are a mixture of any two or more such materials. In some embodiments, the electroactive material is a coated with a second electroactive material. For example, the second electroactive material may be, but is not limited to, a material such as Al$_2$O$_3$, ZrO$_2$, SiO$_2$, MgO, TiO$_2$, CaO, SnO$_2$, WO$_3$, In$_2$O$_3$, Ga$_2$O$_3$, Sc$_2$O$_3$, Y$_2$O$_3$, La$_2$O$_3$, HfO$_2$, SiO$_x$, MoO$_3$, MoO$_2$, V$_2$O$_5$, Nb$_2$O$_5$, Ta$_2$O$_5$, MnO, MnO$_2$, CoO, Co$_2$O$_3$, NiO, NiO$_2$, CuO, ZnO, MgF$_2$, AlF$_3$, CaF$_2$, Mo, Ta, W, Fe, Co, Cu, Ru, Pa, Pt, Al, Si, Se, or a mixture of any two or more such materials In another aspect, an electrochemical device is provided including the carbon-coated electroactive material. Such devices include lithium secondary batteries, lithium primary batteries, capacitors, lithium air batteries, or sodium sulfur batteries.

The above description will be understood more readily by reference to the following examples, which are provided by way of illustration and are not intended to be limiting to any particular embodiment.

EXAMPLES

Example 1

Li$_{1.2}$Mn$_{0.5}$Ni$_{0.176}$Co$_{0.1}$O$_2$ (1.8 g) and graphene oxide (0.2 g) were mixed in water (200 ml), stirred for 2 hours, and heated at 140° C. to remove the water. The mixture was then heated in an oven (250° C.) in an argon atmosphere for 2 hours. Thermal gravimetric analysis showed the presence of 8% carbon in the coated material. XRD (FIG. 1) revealed that the product is pure and that no reduction of the coated material occurred.

Example 2

$Li_{1.2}Mn_{0.5}Ni_{0.176}Co_{0.1}O_2$ (1.8 g) and varying amounts of graphene oxide (2% to 10%) were mixed in water (200 ml) and stirred for 2 h. The mixture was then heated at 140° C. to remove the water. The mixture was then further heated to 250° C., under an argon atmosphere, for 2 hours. Carbon-coated materials, having 2-10% carbon coating, were then recovered.

Example 3

Figure 2:
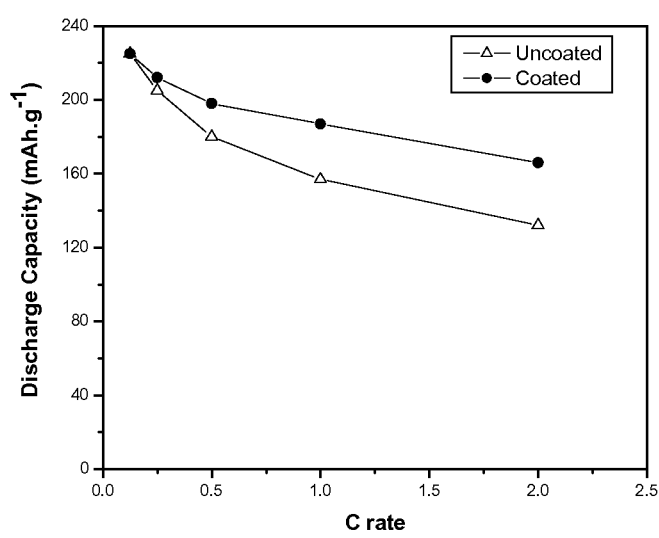
FIG. 2 is a graph showing rate capability of coated (10%) and uncoated $Li_{1.2}Mn_{0.5}Ni_{0.176}Co_{0.1}O_2$, according to one example.
Figure 3:
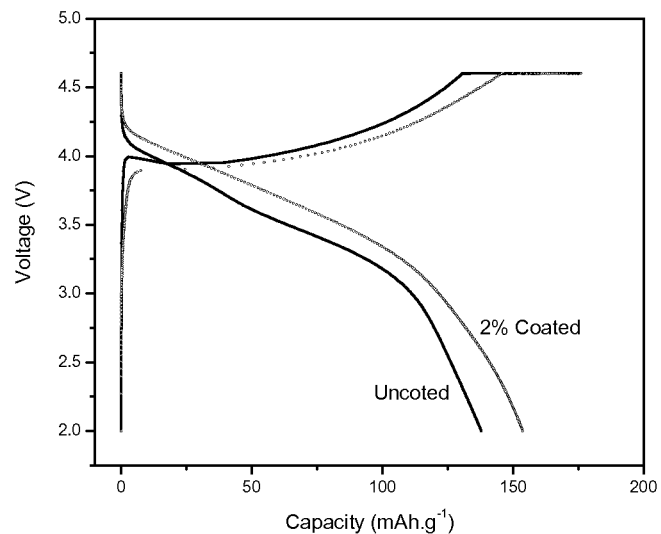
FIG. 3 is a graph showing charge and discharge characteristics at a high rate of 320 mA/g of coated and uncoated $Li_{1.2}Mn_{0.5}Ni_{0.176}Co_{0.1}O_2$, according to one example.
Figure 4:
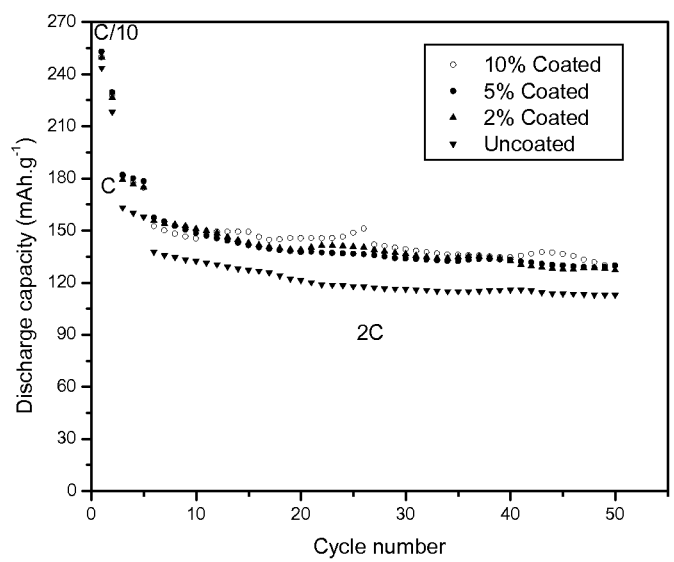
FIG. 4 is a graph showing discharge capacity of uncoated and various coated $Li_{1.2}Mn_{0.5}Ni_{0.176}Co_{0.1}O_2$, according to one example

The $Li_{1.2}Mn_{0.5}Ni_{0.176}Co_{0.1}O_2$ coated, and uncoated materials, were tested in electrochemical generators (CR2032-type coin cells) using lithium metal as a negative electrode, with an electrolyte of 1.2M $LiPF_6$ in EC/DEC (3:7 wt %). A slurry was prepared by mixing $Li_{1.2}Mn_{0.5}Ni_{0.176}Co_{0.1}O_2$ coated (or uncoated) materials (80 g) with 10% carbon black and 10% polyvinylidene fluoride (PVDF) solution in N-methyl-2-pyrrolidone (NMP). The slurry was then deposited on an aluminum current collector. The obtained electrode was used to manufacture coin cells, using a loading of 6 mg/cm² active material. The coin cells were then cycled under various rates. Good rate and charge/discharge capacities were observed for the cells, especially at high rates (FIGS. 2, 3 and 4). The coated and the uncoated materials exhibit the same discharge capacity in the first cycle, at a current rate of 10 mA/g. With only 2% of graphene, under 360 mA/g current rate and after 50 cycles, the coated material delivers more than 128 mAh/g. Under the same conditions, the uncoated material exhibits only 113 mAh/g as a discharge capacity. The 2% graphene coating improves the capacity by approximately 13%.

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

For the purposes of this disclosure and unless otherwise specified, "a" or "an" means "one or more".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process comprising:
   suspending an electroactive material in a solvent;
   dissolving a carbon precursor in the solvent; and
   depositing the carbon precursor on the electroactive material to form a carbon-coated electroactive material, wherein the carbon coating is present from about 0.001 wt % to about 55 wt % based on the weight of the electroactive material;
   wherein:
   the electroactive material is a positive electroactive material or a negative electrode material;
   the positive electrode material is selected from the group consisting of a spinel, a olivine, $LiFePO_4$, $LiMnPO_4$, $LiCoPO_4$, $LiNiPO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $LiMet_{0.5}Mn_{1.5}O_4$, $Li_{1+x}Ni_\alpha Mn_\beta Co_\gamma Met'_\delta O_{2-z}F_{z'}$, $A_nB_2(XO_4)_3$, vanadium oxide, and a mixture of any two or more thereof;
   wherein:
   Met is Al, Mg, Ti, B, Ga, Si, Mn, or Co;
   Met' is Mg, Zn, Al, Ga, B, Zr, or Ti;
   A is Li, Ag, Cu, Na, Mn, Fe, Co, Ni, Cu, or Zn;
   B is Ti, V, Cr, Fe, or Zr;
   X is P, S, Si, W, or Mo;
   $0 \le x \le 0.3$; $0 \le y \le 0.5$; $0 \le z \le 0.5$; $0 \le x' \le 0.4$; $0 \le \alpha \le 1$; $0 \le \beta \le 1$; $0 \le \gamma \le 1$; $0 \le \delta \le 0.4$; $0 \le z' \le 0.4$; and $0 \le n' \le 3$; and
   the negative electroactive material is selected from the group consisting of $Li_4Ti_5O_{12}$, $TiO_2$, metal nitrides, metal phosphides, metal oxides, lithium metal oxides, and a mixture of any two or more thereof;
   wherein the carbon precursor is selected from the group consisting of graphene, graphene oxide, carbon nano-tubes, derivatives thereof, and a combination of any two or more thereof.

2. The process of claim 1, wherein the solvent is selected from the group consisting of an organic solvent and water.

3. The process of claim 1, wherein the depositing comprises heating the dissolved carbon precursor, the solvent, and the electroactive material.

4. The process of claim 1, wherein the graphene, graphene oxide, or carbon nano-tubes are functionalized with a moiety that is an amine, an isocyanate, a phosphonate, a sulfonate, a phosphine, a thiocyanates, or a mixture of any two or more thereof.

5. The process of claim 1, wherein the graphene, graphene oxide, or carbon nano-tubes are functionalized by reaction with a compound selected from the group consisting of allylamine, phenylisocyanate, methylisocyanate, and p-phenyl-$SO_3H$.

6. The process of claim 1, wherein the graphene, graphene oxide, or carbon nano-tubes are oxygenated, hydrated, hydrogenated, halogenated, sulfonated, or a combination of any two or more thereof.

7. The process of claim 1, wherein the carbon precursor is graphene oxide and the depositing comprises adding a reducing agent.

8. The process of claim 7, wherein the reducing agent is hydrazine.

9. The process of claim 3, wherein the heating is performed in an inert, reducing, or oxidizing atmosphere.

10. The process of claim 9, wherein the heating is performed at a temperature in the range from about 250° C. to about 450° C.

11. A composition comprising a carbon-coated electroactive material prepared by the process of claim 1.

12. An electrochemical device comprising the composition of claim 11.

13. The electrochemical device of claim 12 that is a lithium secondary battery, a lithium primary battery, a capacitor, a lithium air battery, or a sodium sulfur battery.

14. The process of claim 1, wherein the carbon-coating is present from about 0.01 wt % to about 55 wt %.

15. The process of claim 1, wherein the carbon-coating is present from about 2 wt % to about 5 wt %.

16. A process comprising:
suspending an electroactive material in a solvent selected from the group consisting of an alcohol, ether, ester, ketone, aromatic, heterocyclic, or a mixture of any two or more thereof;
dissolving a carbon precursor in the solvent; and
depositing the carbon precursor on the electroactive material to form a carbon-coated electroactive material, wherein the carbon coating is present from about 0.001 wt % to about 55 wt % based on the weight of the electroactive material;
wherein:
the electroactive material is a positive electroactive material or a negative electroactive material;
the positive electroactive is selected from the group consisting of a spinel, a olivine, $LiFePO_4$, $LiMnPO_4$, $LiCoPO_4$, $LiNiPO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $LiMet_{0.5}Mn_{1.5}O_4$, $LiMet_{0.5}Mn_1O_4$, $Li_{1+x}Ni_\alpha Mn_\beta Co_\gamma Met'_\delta O_{2-z}F_{z'}$, $A_{n'}B_2(XO_4)_3$, vanadium oxide, and a mixture of any two or more thereof;
wherein:
Met is Al, Mg, Ti, B, Ga, Si, Mn, or Co;
Met' is Mg, Zn, Al, Ga, B, Zr, or Ti;
A is Li, Ag, Cu, Na, Mn, Fe, Co, Ni, Cu, or Zn;
B is Ti, V, Cr, Fe, or Zr;
X is P, S, Si, W, or Mo;
$0 \leq x \leq 0.3$; $0 \leq y \leq 0.5$; $0 \leq z \leq 0.5$; $0 \leq x' \leq 0.4$; $0 \leq \alpha \leq 1$; $0 \leq \beta \leq 1$; $0 \leq \gamma \leq 1$; $0 \leq \delta \leq 0.4$; $0 \leq z' \leq 0.4$; and $0 \leq n' \leq 3$ and
the negative electroactive material is selected from the group consisting of amorphous carbon, $Li_4Ti_5O_{12}$, $TiO_2$, tin, tin alloys, silicon, silicon alloys, metal nitrides, metal phosphides, intermetallic compounds, metal oxide, lithium metal oxide, and a mixture of any two or more thereof.

* * * * *